Sept. 20, 1966  L. A. KOLZE  3,273,850
ZONE VALVE

Filed Oct. 9, 1963  2 Sheets-Sheet 1

INVENTOR.
Lawrence A. Kolze
BY
Hill, Sherman, Meroni, Gross & Simpson
ATTORNEYS

INVENTOR.
Lawrence A. Kolze
BY
Hill, Sherman, Meroni, Gross & Simpson
ATTORNEYS

United States Patent Office 3,273,850
Patented Sept. 20, 1966

3,273,850
ZONE VALVE
Lawrence A. Kolze, Bensenville, Ill., assignor to The Dole Valve Company, Morton Grove, Ill., a corporation of Illinois
Filed Oct. 9, 1963, Ser. No. 314,912
10 Claims. (Cl. 251—11)

This invention relates to fluid control valves, and particularly to a fluid control valve of the type operable in accordance with temperature variations. More particularly, the invention relates to a fluid control valve employing a thermally sensitive element to provide the motive power to operate the valve.

Valves which can be operated automatically as a function of temperature and which are arranged to control convector temperatures within a small area or room surrounding the convector are commonly referred to as zone valves. Such valves can be employed to control the flow of heated or cooled liquid through radiators or the like. There is an increasing trend toward the usage of zone control valves, particularly in apartments, motels, large buildings, and large homes where single point thermostatic control of multiple heating units cannot satisfactorily correlate operation of those heating units with the varying temperatures in multiple rooms.

Zone control valves have been devised in the past which were purely mechanical in operation and which were controlled by the ambient temperature relatively near the valve. It has been found that in certain types of installations, it is desirable in order to most effectively control the temperature of a particular predetermined area, to have a thermostat placed on a wall some distance from the valve.

Recently, attempts have been made to use the fluid circulating systems required to heat the aforementioned types of living quarters in the winter in a second capacity—as a circulating system for cooled liquid during the summer (for air conditioning). It has been found, however, that many fluid control valves are not adapted for use in both types of systems. A system which would require all of its valves to be removed and different valves inserted each time the seasons changed is most undesirable. By arranging the valves so as to be electrically controlled, such as by a wall thermostat, it is possible to utilize such a valve in any desired capacity by a slight adjustment to the thermostat.

It is therefore an object of this invention to provide a zone valve operable by an electrical heating element whose operation is controlled by a remotely positioned thermostat.

It is a further object to provide an electrically controlled zone valve having a set of contacts in its own circuit to control operation of the valve.

It is a further object to provide an electrically controlled zone valve having an auxiliary set of contacts controlled by operation of the valve for operation of a blower motor or the like.

It is a further object to provide a zone valve employing a shear type valve which can be readily assembled and disassembled.

Other objects and advantages will become apparent from the disclosure, taken in conjunction with the accompanying drawings in which.

On the drawings.

Figure 1:
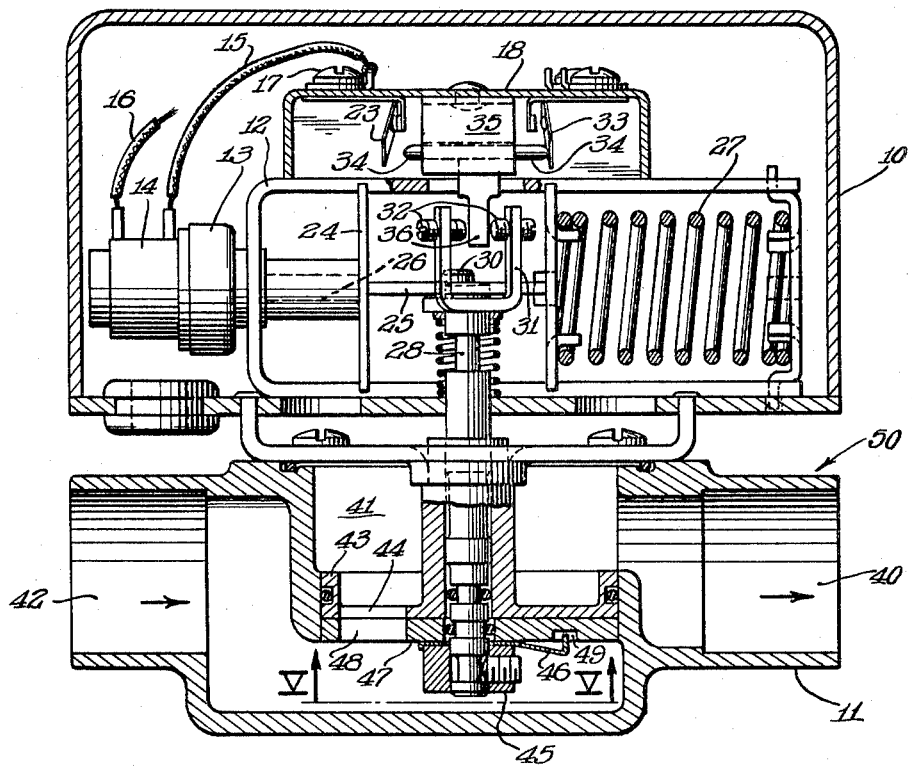
FIGURE 1 is a sectional view of the zone valve showing the upper and lower parts of the valve. A terminal block or switch housing is shown on the upper part of the valve.

Referring now to the drawings, in FIGURE 1 it is seen that the valve 50 is constructed in two sections including an upper part 10 which contains the control mechanism and a lower part 11 which is the portion through which the fluid flows.

Particularly, part 10 comprises a frame or channel 12 to which is mounted a thermally sensitive element 13. An electrical heater assembly 14, having leads 15 and 16 extending therefrom is secured to the outer end of thermally sensitive element 13. Lead 15 extends to terminal 22 on the terminal block 18. Terminal 22 in turn is conncted to movable contact 23 which coacts with stationary contact 21 to complete a circuit through terminal 17 and lead 20 to one side of the secondary of transformer T. The other side of the secondary of transformer T is connected through leads 15 and 16, thermostat 19 and lead 16 with the other side of the heater coil 14.

Returning to FIGURE 1, it is seen that channel 12 carries a slider 24 which is generally H-shaped with a plate 25 representing the cross bar of the H. Thermally sensitive element 13 has an operating plunger 26 bearing against the slider 24. Thus, if element 13 is energized, plunger 26 will move outward, exerting force against the slider to move the slider relative to channel 12. When element 13 is deenergized, plunger 26 is retracted by spring 27 acting on slider 24.

Figure 2:
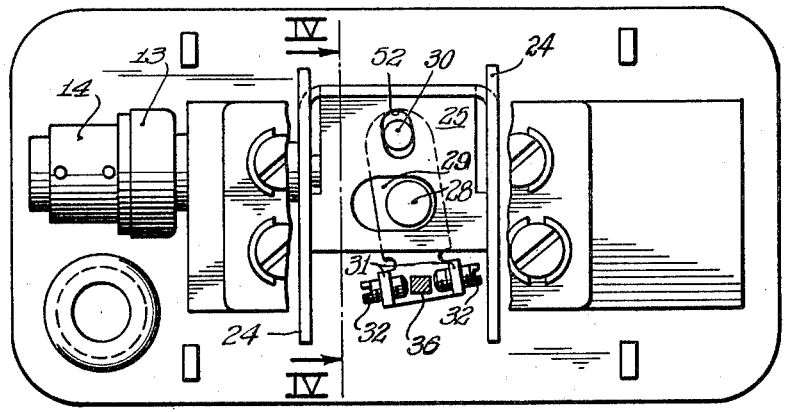
FIGURE 2 is a top view of the zone valve partly cut away to show the interior of the valve.
Figure 3:
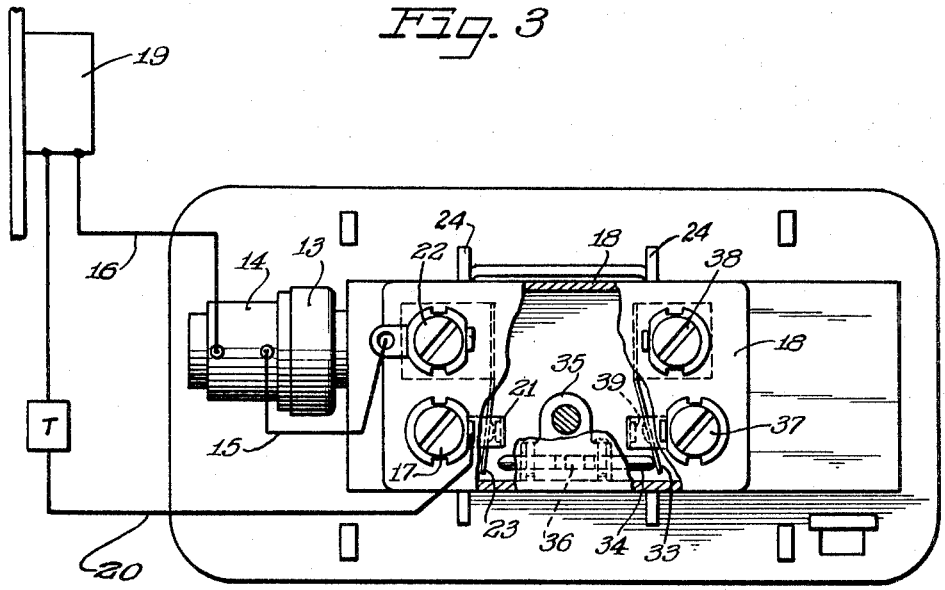
FIGURE 3 is a top view of the zone valve with the terminal block partly cut away, to show the contact arrangement. Also shown is the wall thermostat and the circuit to the thermally sensitive element and terminal block.
Figure 4:
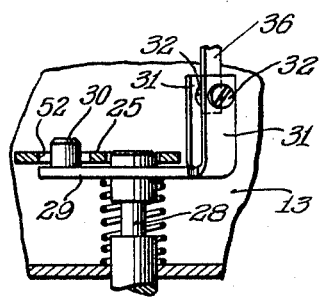
FIGURE 4 is a view taken along line IV—IV of FIGURE 2, showing the details of the control mechanism within the valve.

As shown in FIGURES 1, 2 and 4, shaft 28 (extending from the lower part 11 of valve 50) carries a lever 29 at its upper end. Lever 29 has a pin 30 at one end and a U-shaped portion 31 at the other end. U-shaped portion 31 has an adjustment screw 32 in each leg. As plate 25 is moved relative to channel 12 by plunger 26, pin 30, which protrudes through aperture 52 in plate 25, also is moved. Pin 30, however, extends from lever 29 which is secured to shaft 28. Therefore, when pin 30 is moved, shaft 28 is rotated. It is noted that terminal block 18 is mounted atop frame 12 and has two movable contacts 23 and 33 operable by slider 34. Slider 34 is slidably mounted within a cavity (not shown) in block 35 and has a finger 36 depending therefrom to a point between adjustment screws 32.

It is observed that as lever 29 is rotated about shaft 28 by the aforementioned relationship of plate 25 and pin 30, finger 36 is moved laterally by engagement with adjustment screws 32. As finger 36 is moved, rod 34 slides in block 35 to engage movable contact 23 and release movable contact 33. When movable contact 23 breaks away from stationary contact 21, the circuit is opened to heater assembly 14. Spring 27 slowly returns plunger 26 to its retracted position as the temperature of thermally sensitive element 13 drops.

It will be appreciated that terminals 37 and 38 (connected to stationary contact 39 and movable contact 33, respectively) can be placed in an auxiliary control circuit to control any desired type of apparatus, such as a blower motor, circulatory pump, or the like which is to be operated under the influence of thermostat 19.

Figure 5:
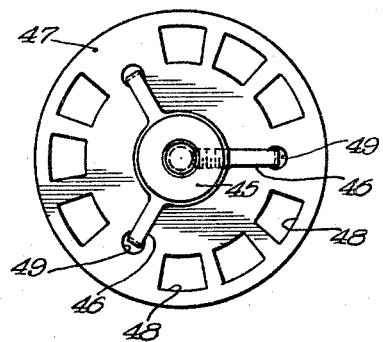
FIGURE 5 is a view taken along line V—V of FIGURE 1, showing the shear disc and the structure which secures this disc to the control shaft.
Figure 6:
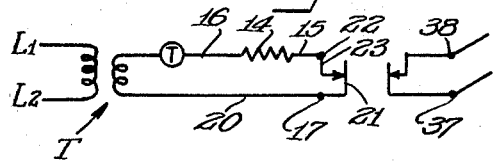
FIGURE 6 is a diagrammatic representation of the circuitry for the subject mechanism.

The lower part 11 of valve 50 comprises a fluid inlet 42, a substantially cylindrically shaped fluid chamber 41 and an outlet 40. A seal disc 43, having a number of ports 44, is mounted in chamber 41. Shaft 28 extends downwardly through the center of seal disc 43 and has a collar 45 attached at the lower end thereof. A spider wheel including a plurality of fingers 46 (shown in FIGURE 5) is mounted on collar 45. A rotatable shear disc 47 is pressed tightly against the seal disc 43 by fingers 46 of the spider wheel. This shear disc 47 has nine pie-shaped apertures 48 which correspond to the aforementioned ports 44 in seal disc 43. Each finger 46 of the spider wheel engages a depression 49 in disc 47. In this manner, rotational movement of shaft 28 and collar 45 will be imparted to shear disc 47. From the foregoing description, it is obvious that when the apertures 48 of shear disc 47 are aligned with ports 44 of seal disc 43, a fluid path will be opened between chamber 41 and outlet 42. This fluid path can be closed by deenergization of thermally sensitive element 13. It has been found that for highest wear resistance and ease of operation, disc 47 should preferably be formed of carbon material, though ceramic materials have also been used.

Operation of the instant embodiment of this invention is as follows:

The zone valve 50 is placed in a desired location in a fluid line. Thermostat 19 is placed within the zone, the temperature of which it is to regulate. Valve 50 is normally closed. As the temperature adjacent thermostat 19 drops to a predetermined level, the slider 24 shifts to the right, U-shaped member 31 pivots to the left, slider 34 shifts to the left, and an electrical potential is applied across leads 15 and 16. Movable contact 23 is normally in engagement with stationary contact 21 so that if a potential is applied arross leads 15 and 16, the heater assembly 14 will be energized. As heater assembly 14 warms, the temperature of thermally sensitive element 13 rises, causing plunger 26 to move outward against the slider 24. Plate 25 engages pin 30 on lever 29 and pivots lever 29, which imparts rotational movement to shaft 28. As shaft 28 rotates, apertures 48 are moved into alignment with ports 44 to initiate fluid flow through valve 50.

Energization of heater assembly 14 causes slider 24 to move toward the right, the U-shaped end of member 29 to pivot to the left, and slider 34 to shift to the left to open the switch 21, 23 and break the heater assembly circuit, whereupon the cycle is again repeated.

While the invention has been described with reference to a particular environment, other applications will be readily apparent to those skilled in the art. The invention, therefore, is not limited to the particular arrangement shown and described but covers all modifications within the spirit and scope of the claims.

I claim as my invention:

1. A fluid control valve comprising:
 (a) a valve body having an inlet and an outlet and a port communicating said inlet with said outlet,
 (b) a shaft journaled for rotary movement within said body having a valve disc mounted thereon and rotatable therewith and overlying said port,
 (c) an aperture in said disc positionable in registry with said port to permit maximum fluid flow through said valve, whereby rotation of said disc to move said aperture out of registry with said port will decrease the flow of fluid through said valve,
 (d) a radially extending lever connected to said shaft for rotation therewith,
 (e) a rectilinearly movable element pivotally connected to a free end of said lever, whereby rectilinear movement of said element will effect rotary movement of said shaft,
 (f) a motor mounted on said body and having an element extensible therefrom upon energizing thereof where said extensible element abuts said rectilinearly movable element whereby movement of the said extensible element imparts rectlinear movement to the said rectilinearly movable element,
 (g) an electric switch having a plurality of contacts and a switch finger whereby movement of the switch finger opens and closes the said contacts,
 (h) an adjustable mechanical linkage between the said switch finger and the said lever whereby extensible and retractable movement of the said extensible element imparts movement to the said switch finger through cooperation of the said rectlinearly movable element, the said lever, and the said mechanical linkage, and
 (i) an electric circuit comprising the said motor and a pair of contacts of the said electric switch and connected to an electric power source, whereby current flow in the electric circuit energizes the motor causing the said extensible element to extend and whereby the electric switch controls the current flow in said circuit in response to extension of the said extensible element.

2. In a control valve:
 (a) a thermally responsive element having an operating plunger extending therefrom, sponsive element,
 (b) a heater assembly adjacent said thermally responsive element,
 (c) a support, said thermally responsive element mounted on said support,
 (d) a frame slidable on said support, one end of said operating plunger abutting said frame, whereby movement of said operating plunger slides said frame on said support, said frame including a plate having an oblong eperture therein,
 (e) a rotatable control shaft,
 (f) a lever secured inttrmediate its ends to a first end of said control shaft, said lever including a pin at one end thereof, said pin extending into said oblong aperture in said plate, whereby sliding movement of said frame moves said pin in an arc and rotates said shaft, said lever also including a U-shaped portion at the other end thereof, each leg of said U having an adjustable member mounted thereon,
 (g) a switch mounted on said support, said switch including a pair of contacts, each said contact having a movable element and a stationary element,
 (h) a rod slidably mounted on said support between said movable elements, and end of said rod adjacent each of said movable elements, said rod having a finger extending laterally therefrom, said finger extending between said adjustable members of said U-shaped portion of said lever, whereby movement of said finger a predetermined amount by said adjustable member closes one of said contacts and opens the other of said contacts,
 (i) a valve body mounted on said support including an inlet and on outlet and a chamber communicating said inlet and outlet,
 (j) a second end of said control shaft extending into said chamber,
 (k) a seal disc mounted in said chamber and having a port therein,
 (l) a shear disc positioned for rotational movement adjacent said seal disc, said shear disc having an aperture therein and a plurality of indentations in one side thereof, whereby when said aperture is aligned with said port in said seal disc, a flow path is opened to said outlet,
 (m) and a spider wheel secured to said second end of said shaft, said spider wheel including a plurality of fingers extending therefrom, said fingers engageable with said indentations in said shear disc whereby rotational movement of said spider wheel is imparted to said shear disc.

3. A control arrangement for a valve comprising:
  (a) a thermally responsive element having an operating plunger extending therefrom,
  (b) a heater assembly adjacent said thermally responsive element,
  (c) a support, said thermally responsive element mounted on said support,
  (d) a frame slidable on said support, one end of said operating plunger adjacent to said frame, whereby movement of said operating plunger slides said frame on said support, said frame including a plate having an oblong aperture therein,
  (e) a rotatable control shaft,
  (f) a lever secured intermediate its ends to a first end of said control shaft, said lever including a pin at one end thereof, said pin extending into said oblong aperture in said plate, whereby sliding movement of said frame moves said pin in an arc and rotates said shaft, said lever also including a U-shaped portion at the other end thereof, each leg of said U having an adjustable member mounted thereon,
  (g) a switch mounted on said support, said switch including a plurality of contacts, each said contact having a movable element and a stationary element,
  (h) a rod slidably mounted on said support between said movable elements, an end of said rod adjacent each of said movable elements, said rod having a finger extending laterally therefrom, said finger extending between said adjustable members of said U-shaped portion of said lever whereby movement of said finger a predetermined amount by said adjustable member actuates one of said contacts and opens another of said contacts.

4. A control arrangement for a valve comprising:
  (a) a thermally responsive element having an operating plunger extending therefrom,
  (b) a heater assembly adjacent said thermally responsive element,
  (c) a support, said thermally responsive element mounted on said support,
  (d) a frame slidable on said support, one end of said operating plunger adjacent said frame, whereby movement of said operating plunger slides said frame on said support, said frame including a plate having an oblong aperture therein,
  (e) a rotatable control shaft,
  (f) a lever secured intermediate its end to a first end of said control shaft, said lever including a pin at one end thereof, said pin extending into said oblong aperture in said plate, whereby sliding movement of said frame moves said pin in an arc and rotates said shaft.

5. In a control valve:
  (a) a thermally responsive element having an operating plunger extending therefrom,
  (b) a heater assembly adjacent said thermally responsive element,
  (c) a support, said thermally responsive element mounted on said support,
  (d) a frame slidable on said support, one end of said operating plunger adjacent said frame, whereby movement of said operating plunger slides said frame on said support, said frame including a plate having an oblong aperture therein,
  (e) a rotatable control shaft,
  (f) a valve body mounted on said support including an inlet and an outlet and a chamber communicating said inlet and said outlet, one end of said control shaft extending into said chamber,
  (g) a seal disc mounted in said chamber and having a port therein,
  (h) a shear disc positioned for rotational movement adjacent said seal disc, said shear disc having an aperture therein and a plurality of indentations in one side thereof, whereby when said aperture is aligned with said port in said seal disc, a flow path is opened to said outlet,
  (i) a spider wheel secured to said one end of said control shaft, said spider wheel including a plurality of fingers extending therefrom, said fingers engageable with said indentations in said shear disc whereby rotational movement of said spider wheel is imparted to said shear disc.

6. In a control valve:
  (a) a thermally responsive element having an operating plunger extending therefrom,
  (b) a rotatable control shaft,
  (c) a support for mounting said thermally responsive element,
  (d) transfer means coupling said operating plunger to said control shaft, whereby longitudinal movement of said plunger rotates said control shaft,
  (e) a lever secured intermediate its ends to an end of said control shaft and one free end of said lever connected to said transfer means whereby sliding movement of the said transfer means moves said lever and rotates said shaft, said lever also including a generally U-shaped portion at the other end thereof, each leg of said U having an adjustable member mounted thereon,
  (f) a switch mounted on said support, said switch including a plurality of contacts, each said contact having a movable element and a stationary element,
  (g) a rod slidably mounted on said support between said movable elements, an end of said rod adjacent each of said movable elements, said rod having a finger extending laterally therefrom, said finger extending between said adjustable members on said U-shaped portion of said lever, whereby movement of said finger by said adjustable members closes one of said contacts and opens another of said contacts.

7. In a control valve:
  (a) a thermally responsive element having an operating plunger extending therefrom,
  (b) a support, said thermally responsive element mounted on said support,
  (c) a rotatable control shaft,
  (d) transfer means coupling said operating plunger to said control shaft, whereby longitudinal movement of said plunger rotates said control shaft,
  (e) a valve body mounted on said support and including an inlet and an outlet and a chamber communicating said inlet and outlet,
  (f) an end of said control shaft extending into said chamber,
  (g) a seal disc mounted in said chamber and having a port therein,
  (h) a shear disc positioned for rotational movement adjacent said seal disc, said shear disc having an aperture therein and a plurality of indentations in one side thereof, whereby when said aperture is aligned with said port in said seal disc, a flow path is open to said outlet,
  (i) a spider wheel secured to said end of said shaft, said spider wheel including a plurality of fingers extending threfrom, said fingers engageable with said indentations in said shear disc whereby rotational movement of said spider wheel is imparted to said shear disc.

8. In a control valve:
  (a) a thermally responsive element having an operating plunger extending therefrom,
  (b) an electrical heater assembly adjacent said thermally responsive element,
  (c) a support, said thermally responsive element mounted on said support,
  (d) a frame slidable on said support, one end of said operating plunger adjacnt said frame, whereby movement of said operating plunger slides said frame on said support, said frame including a plate having an oblong aperture therein,
(e) a rotatable control shaft,
(f) a lever secured intermediate its ends to a first end of said control shaft, said lever including a pin at one end thereof, said pin extending into said oblong aperture in said plate, whereby sliding movement of said frame moves said pin in an arc and rotates said shaft, said lever also including a U-shaped portion at the other end thereof, each leg of said U having an adjustable member mounted thereon,
(g) a source of electrical potental,
(h) a switch mounted on said support, said switch including a plurality of contacts, each said contact having a movable element and a stationary element, one pair of said contacts being in a circuit including said electrical heater assembly and said source of electrical potential,
(i) a rod slidably mounted on said support between said movable elements, one end of said rod adjacent each of said movable elements, said rod having a finger extending laterally therefrom, said finger extending between said adjustable members on said U-shaped portion of said lever wherby movement of said finger by said adjustable members in one direction closes said one pair of contacts to complete said circuit including said electrical heater and source of electrical potential.

9. In a control valve:
(a) a thermally responsive element having an operating plunger extending therefrom,
(b) an electrical heater assembly adjacent said thermally responsive element,
(c) a support, said thermally responsive element mounted on said support,
(d) a frame slidable on said support, one end of said operating plunger adjacent said frame, whereby movement of said operating plunger slides said frame on said support, said frame including a plate having an oblong aperture therein,
(e) a rotatable control shaft,
(f) a lever secured intermediate its ends to a first end of said control shaft, said lever including a pin at one end thereof, said pin extending into said oblong aperture in said plate, whereby sliding movement of said frame moves said pin in an arc and rotates said shaft, said lever also including a U-shaped portion at the other end thereof, each leg of said U having an adjustable member mounted thereon,
(g) a source of electrical potential,
(h) a switch on said support, said switch including a plurality of contacts, each said contact having a moveable element and a stationary element, one pair of said contacts being in a circuit including said electrical heater assembly and said source of electrical potential,
(i) a rod slidably mounted on said support between said movable elements, and end of said rod adjacent each of said movable elements, said rod having a finger extending laterally therefrom, said finger extending between said adjustable members on said U-shaped portion of said lever, whereby movement of said finger by said adjustable members in one direction closes one of said pairs of contacts to complete said circuit including said electrical heater and source of electrical potential,
(j) a valve body mounted on said support including an inlet and an outlet and a chamber communicating said inlet and outlet,
(k) a second end of said control shaft extending into said chamber,
(l) a seal disc mounted in said chamber and having a port therein,
(m) a shear disc positioned for rotational movement adjacent said seal disc, said shear disc an aperture therein, and a plurality of indentations in one side thereof, whereby when said aperture is aligned with said port in said seal disc a flow path is opened to said outlet,
(n) a spider wheel secured to said second end of said shaft, said spider wheel including a plurality of fingers extending therefrom, said fingers engageable with said indentations in said shear disc whereby rotational movement of said spider wheel is imparted to said shear disc, and said shear disc is pressed against said seal disc.

10. Means for controlling fluid flow through a rotary disc valve where said means comprise:
a valve body having an inlet,
an outlet,
a port communicating said inlet and said outlet, and a rotary valve disc cooperable with said port to control fluid flow therethrough,
a shaft connected to and co-rotatable with said rotary valve disc,
a motor having an energizable element and an extensible element,
a mechanical connection between the said extensible element and the said shaft for imparting rotary movement to the said shaft in response to the movement of said extensible element,
means for sensing rotary movement of the said shaft whereby the said sensing means causes the said energizable element of the said motor to be deenergized in response to a predetermined amount of rotary movement of the said shaft,
an electric circuit including the said electric motor and the said sensing element and the said circuit connected to an electric power source.

References Cited by the Examiner
UNITED STATES PATENTS

| | | | |
|---|---|---|---|
| 130,876 | 8/1872 | Stevens | 251—180 |
| 1,517,728 | 12/1924 | Heath | 251—58 |
| 1,854,531 | 4/1932 | Tweit et al. | 251—58 |
| 2,061,716 | 11/1936 | Pratt et al. | 251—180 X |
| 3,037,484 | 6/1962 | Dixon | 251—131 X |
| 3,056,573 | 10/1962 | Matheson et al. | 251—58 X |
| 3,104,592 | 9/1963 | Sheesley | 251—58 X |
| 3,164,365 | 1/1965 | White et al. | |

M. CARY NELSON, *Primary Examiner.*

E. FEIN, *Assistant Examiner.*